(12) United States Patent  
Sunaga

(10) Patent No.: US 6,282,018 B1
(45) Date of Patent: Aug. 28, 2001

(54) OPTICAL ELEMENT AND OPTICAL DEVICE HAVING IT

(75) Inventor: Toshihiro Sunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/401,658

(22) Filed: Sep. 23, 1999

(30) Foreign Application Priority Data

Sep. 28, 1998 (JP) .................................................. 10-290028

(51) Int. Cl.⁷ .................................................. G02B 17/00
(52) U.S. Cl. .......................... 359/365; 359/366; 359/589; 359/585; 359/586
(58) Field of Search ..................... 359/365, 366, 359/589, 584, 585, 586, 587, 885, 839, 836

(56) References Cited

U.S. PATENT DOCUMENTS

| 5,514,740 | 5/1996 | Miyake et al. ........................ 524/420 |
| 5,726,805 | * 3/1998 | Kaushik et al. ...................... 359/589 |
| 5,825,560 | 10/1998 | Ogura et al. ........................... 359/822 |
| 5,850,309 | * 12/1998 | Shirai et al. .......................... 359/360 |
| 5,995,287 | * 11/1999 | Sekita .................................. 359/599 |

FOREIGN PATENT DOCUMENTS

| 0 730 169 | 9/1996 | (EP) . |
| 6-73197 | 3/1994 | (JP) . |
| 6-222211 | 8/1994 | (JP) . |
| 8-292371 | 11/1996 | (JP) . |
| 8-292372 | 11/1996 | (JP) . |
| 9-5650 | 1/1997 | (JP) . |
| 9-90229 | 4/1997 | (JP) . |

* cited by examiner

*Primary Examiner*—Mohammad Sikder
(74) *Attorney, Agent, or Firm*—Fitzpatrick, Cella, Harper & Scinto

(57) ABSTRACT

An optical element has a plurality of reflective surfaces formed integrally so as to reflect light incident thereto successively and thereafter guide it out of the optical element. The optical element is provided with a member for preventing light of a predetermined wavelength band from emerging from the optical element.

14 Claims, 5 Drawing Sheets

OPTICAL ELEMENT AND OPTICAL DEVICE HAVING IT

BACKGROUND OF THE INVENTION

1. Field of the Invention

The present invention relates to an optical element and an optical device incorporating it and, more particularly, to those suitably applicable to video cameras, still video cameras, copiers, etc. making use of the optical element with a plurality of reflective surfaces having curvature.

2. Related Background Art

CCD image pickup elements used in the video cameras, digital cameras, etc. have their sensitivity in a relatively wide wavelength region and also respond to light other than the light in the visible region. Since color filters normally used for the image pickup elements transmit the light of wavelengths except for the visible rays, this would become a false color signal to pose a trouble in color reproduction. It is thus common practice to interpose a filter for removing the light of unwanted wavelengths in an optical system of the presently available video cameras, digital cameras, and so on. Colored glass sheets, for example, equivalents to color glass CM-500 (available from HOYA K.K. etc.), have been used heretofore as infrared cut filters commonly used for removal of infrared rays. It is also necessary to use a filter for removing ultraviolet rays when a sensor used is sensitive to shorter wavelengths.

There are three probable approaches as methods for cutting the light of unwanted wavelengths.

(a-1) The light of unwanted wavelengths is absorbed, while the light of necessary wavelengths is transmitted.

(a-2) The light of unwanted wavelengths is transmitted, while the light of necessary wavelengths is reflected.

(a-3) The light of unwanted wavelengths is reflected, while the light of necessary wavelengths is transmitted.

Materials used in the method of (a-1) include resin compositions invented as described in Japanese Patent Application Laid-Open Nos. 6-73197 (corresponding to U.S. Pat. No. 5,514,740), 6-222211, etc., in addition to the colored glasses. An optical element used in the method of (a-2) is a cold mirror. Materials used in the method of (a-3) include dielectric multilayer films for preventing transmission of infrared light, and the like.

On the other hand, it has been clarified as to non-coaxial optical systems that an optical system well corrected for aberration was able to be constructed by introducing the concept of a reference axis and making component surfaces of asymmetric, aspherical surfaces; for example, Japanese Patent Application Laid-Open No. 9-5650 describes a design method thereof and Japanese Patent Application Laid-Open Nos. 8-292371 and 8-292372 (both corresponding to U.S. Pat. No. 5,825,560) describe design examples thereof.

Such non-coaxial optical systems are called of-faxial optical systems (which are optical systems defined as optical systems including a curved surface (off-axial curved surface) a normal to which at an intersecting point of the component surface with the reference axis does not lie on the reference axis, where the reference axis is considered to be along a ray passing the center of the image and the center of the pupil, the reference axis being of a bent shape). In these off-axial optical systems, the component surfaces are normally non-coaxial and there occurs no eclipse even at a reflective surface. It is thus easy to construct an optical system of reflective surfaces. They also have such features that routing of the optical path is relatively free and that it is easy to construct an integral optical system by integral molding of component surfaces.

Since the conventional methods for removing the light of unwanted wavelengths have employed the single-unit wavelength selecting filter interposed in the optical system, they had the problem that an extra housing space was necessary for the filter and it impeded downsizing of the lens system. The back focus must be longer by the thickness of the filter and this posed the problem of restrictions on the design. In addition, the above structure necessitated a member for holding the filter.

SUMMARY OF THE INVENTION

In view of the above problems, an object of the present invention is to relax the restrictions on the design and decrease the size of the optical system using the optical element, by providing the optical element with wavelength selectivity to remove the light of a predetermined unwanted wavelength band.

Another object of the present invention is to provide an optical element which necessitates no holding member for the filter member and production cost of which is decreased, and an optical device incorporating it.

In order to accomplish the above objects, an optical element of the present invention is characterized by comprising:

a plurality of reflective surfaces integrally formed, wherein light incident to said optical element is successively reflected by the plurality of reflective surfaces and thereafter emerges from said optical element; and means for preventing light of a predetermined wavelength band from emerging from said optical element.

An optical device according to the present invention is characterized by comprising the above-stated optical element of the present invention and an aperture stop.

DETAILED DESCRIPTION OF THE PREFERRED EMBODIMENTS

Figure 1:
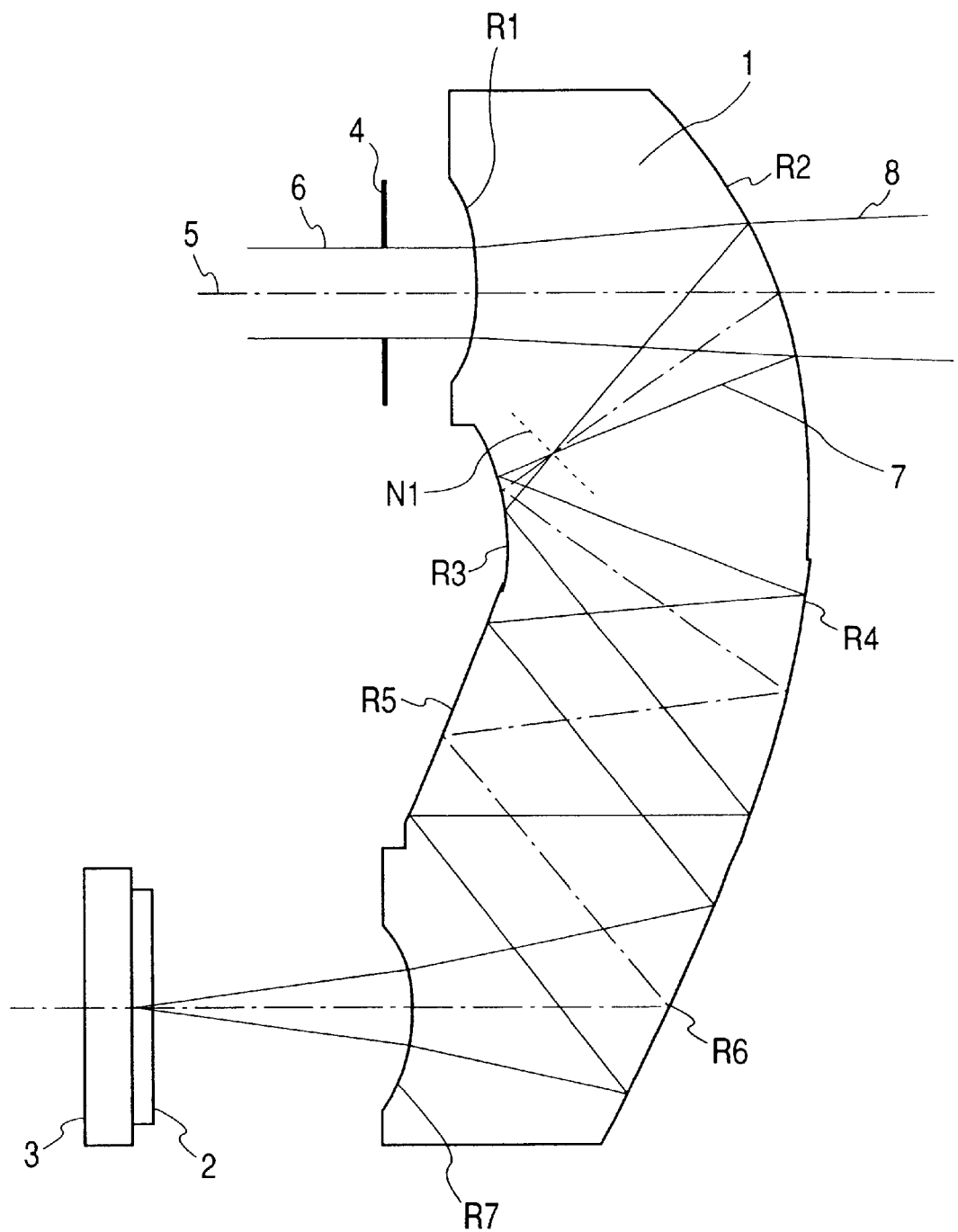
FIG. 1 is a diagram to show the structure of the optical system in Embodiment 1 of the present invention.

FIG. 1 is a schematic diagram of major part of a Embodiment 1 of the present invention.

In FIG. 1, the optical element 1 is formed in a solid shape in which two refractive surfaces (R1, R7), which are the entrance and exit surfaces having curvature, and a plurality of reflective surfaces (R2 to R6) are formed in an integral form in surfaces of a transparent body. The optical element 1 is comprised of the two refractive surfaces and the five reflective surfaces, which are a concave, refractive surface R1, a concave mirror R2, a convex mirror R3, a concave mirror R4, a convex mirror R5, a concave mirror R6, and a concave refractive surface R7 arranged in the named order from the object side. Here the concave mirror R2 is a reflecting mirror that transmits the light of a predetermined wavelength band unwanted among object light but reflects the light of necessary wavelengths.

The light of unwanted wavelengths herein is light not used at all in forming an object image on a predetermined surface. Specifically, the unwanted light is light not used for the imaging action, of course, and not used for photometry, distance measurement, etc., either; for example, infrared light or ultraviolet light.

A direction of the reference axis 5 incident to the optical element 1 is approximately parallel and opposite to a direction of the reference axis 5 outgoing from the optical element 1. Numeral 2 designates an optical low-pass filter, 3 a surface of an image pickup element such as the CCD or the like, 4 a stop disposed on the object side of the optical element 1, and 5 the reference axis of a photographing optical system (image pickup optical system).

The reference axis 5 herein is defined as an optical path of a ray passing the center of the stop 6 and entering the center of the final image plane (image pickup element) 3. Each of the reflective surfaces R2 to R6 is a so-called off-axial surface a normal to which does not agree with the reference axis 5 and is a rotationally asymmetric, aspherical surface without a rotational symmetry axis for good correction for aberration.

The imaging relation in the present embodiment will be described. The light 6 from the object is regulated in the amount of incident light by the stop 4 and thereafter it is incident to the concave, refractive surface R1 of the optical element 1. The light incident into the concave, refractive surface R1 is refracted by the power of the concave, refractive surface R1, whereby the object light 6 turns into diverging light. After that, the concave mirror R2 transmits light 8 of unwanted wavelengths out of the object light 6 and reflects light 7 of necessary wavelengths. Further, the light 7 of necessary wavelengths is focused primarily to form an object image on an intermediate image plane N1 by the power of the concave mirror. This imaging of the object image in the optical element 1 in the early stage restrains increase in ray-effective diameters of the surfaces placed on the image side of the stop 4.

The light 7 of necessary wavelengths undergoing the primary imaging on the intermediate image plane N1 is then repeatedly reflected successively by the convex mirror R3, the concave mirror R4, the convex mirror R5, and the concave mirror R6 while being affected by the powers of the respective reflecting mirrors, and thereafter reaches the concave, refractive surface R7. The light of necessary wavelengths refracted by the power of the concave, refractive surface R7 travels through the low-pass filter 2 to form an object image on the image pickup element surface 3. As described, the optical element 1 functions as an optical unit having the desired optical performance and forming the real image as a whole while repeatedly effecting the refractions by the entrance and exit surfaces and the reflections by the plurality of reflecting mirrors having curvature.

The present embodiment obviates the necessity for the wavelength selecting filter, which was placed immediately in front of the image pickup element surface 3 heretofore, by the configuration in which the concave mirror R2 is the reflecting mirror that transmits the light of unwanted wavelengths but reflects the light of necessary wavelengths.

Although in the present embodiment the concave mirror R2 was the wavelength-selective reflecting mirror that transmits the light of unwanted wavelengths but reflects the light of necessary wavelengths, it is also possible to employ such a configuration that either one of the convex mirror R3, the concave mirror R4, the convex mirror R5, and the concave mirror R6 is such a reflecting mirror. In another configuration, a plurality of reflective surfaces may be reflecting mirrors with wavelength selectivity.

Figure 2:
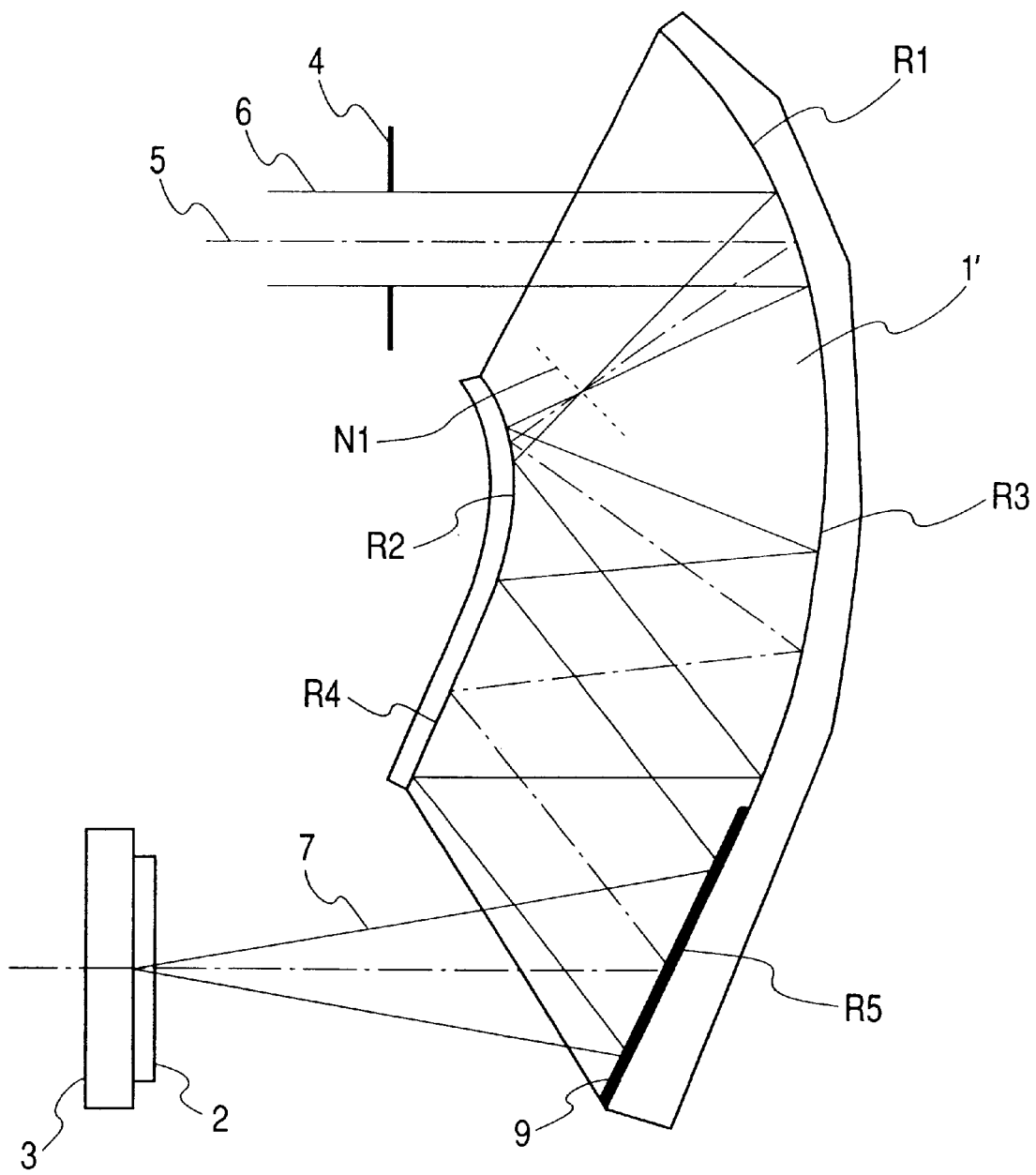
FIG. 2 is a diagram to show the structure of the optical system in Embodiment 2 of the present invention.

FIG. 2 is a schematic diagram of major part of Embodiment 2 of the present invention.

In FIG. 2, the optical element 1' is formed in a hollow shape in which a plurality of surface-reflective surfaces (R1 to R5) having curvature are formed in an integral form. The optical element 1' is an optical element comprised of five reflective surfaces, which are a concave mirror R1, a convex mirror R2, a concave mirror R3, a convex mirror R4, and a concave mirror R5 arranged in the named order from the object side. The direction of the reference axis incident to the optical element 1' is approximately parallel and opposite to the direction of the reference axis outgoing from the optical element 1'. Numeral 2 designates the optical low-pass filter, 3 the surface of the image pickup element such as the CCD or the like, 4 the stop disposed on the object side of the optical element 1', and 5 the reference axis of the photographing optical system. Here the surface of the concave mirror R5 is covered by a material 9 that absorbs the light of unwanted wavelengths but transmits the light of necessary wavelengths.

The imaging relation in the present embodiment will be described. The light 6 from the object is regulated in the amount of incident light by the stop 4 and thereafter it is incident to the optical element 1'. The incident light is focused primarily to form an object image on the intermediate image plane N1 by the power of the concave mirror R1. This imaging of the object image in the optical element 1' in the early stage restrains the increase in the ray-effective diameters of the surfaces placed on the image side of the stop 4.

The object light 6 undergoing the primary imaging on the intermediate image plane N1 is then repeatedly reflected successively by the convex mirror R2, the concave mirror R3, the convex mirror R4, and the concave mirror R5 while being affected by the powers of the respective reflecting mirrors, and thereafter the light travels through the low-pass filter 2 to form the object image on the image pickup element surface 3. Here the material 9 provided on the light reflecting surface of the concave mirror R5 absorbs the light of unwanted wavelengths, and transmits the light 7 of necessary wavelengths which is then reflected by the light reflecting surface of the concave mirror R5. Namely, the concave mirror R5 functions as a wavelength selecting filter. Since the material 9 is placed over the reflective surface, a necessary thickness thereof can be half of that in the case of a transmitting surface.

As described, the optical element 1' functions as an optical unit having the desired optical performance and forming the real image as a whole while repeatedly effecting the reflections by the plurality of reflecting mirrors having curvature.

The present embodiment obviates the need for the wavelength selecting filter, which was placed immediately in front of the image pickup element surface 3 heretofore, by covering the surface of the concave mirror R5 with the material 9 that absorbs the light of unwanted wavelengths but transmits the light of necessary wavelengths.

Although in the present embodiment the surface of the concave mirror R5 was covered by the material 9 that absorbed the light of unwanted wavelengths but transmitted the light of necessary wavelengths, it is also possible to employ such a configuration that either one of the concave mirror R1, the convex mirror R2, the concave mirror R3, and the convex mirror R4 is covered by the material 9. In another configuration, a plurality of reflective surfaces may be covered by the material 9.

Figure 3:
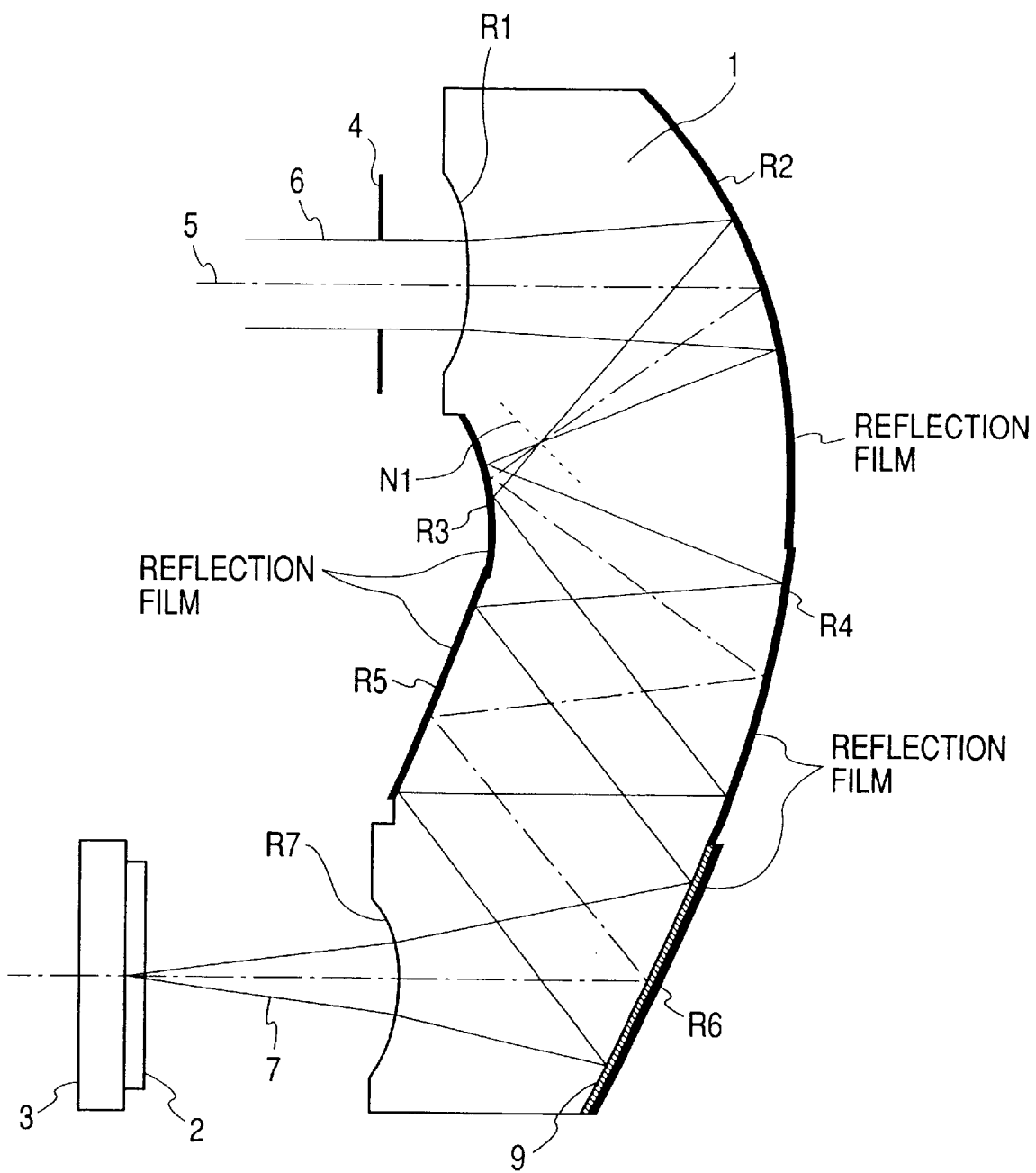
FIG. 3 is a diagram to show the structure of the optical system in Embodiment 3 of the present invention.

FIG. 3 is a schematic diagram of major part of Embodiment 3 of the present invention.

In FIG. 3, the optical element 1 is formed in a solid shape in which two refractive surfaces (R1, R7), which are the entrance and exit surfaces having curvature, and a plurality of reflective surfaces (R2 to R6) are formed in an integral form in surfaces of a transparent body. The optical element 1 is comprised of the two refractive surfaces and the five reflective surfaces, which are a concave, refractive surface R1, a concave mirror R2, a convex mirror R3, a concave mirror R4, a convex mirror R5, a concave mirror R6, and a concave, refractive surface R7 arranged in the named order from the object side. The direction of the reference axis 5 incident to the optical element 1 is approximately parallel and opposite to the direction of the reference axis 5 outgoing from the optical element 1. Numeral 2 designates the optical low-pass filter, 3 the surface of the image pickup element such as the CCD or the like, 4 the stop disposed on the object side of the optical element 1, and 5 the reference axis of the photographing optical system. Numeral 9 denotes a material that absorbs the light of unwanted wavelengths but transmits the light of necessary wavelengths. On the optical element 1, reflection films are formed normally by evaporation of metal or by electroless plating. In the present embodiment, the surface to be the concave mirror R6 is first covered by the material 9 and it is further covered by the reflection film to form the concave mirror R6.

The imaging relation in the present embodiment will be described. The light 6 from the object is regulated in the amount of incident light by the stop 4 and thereafter it is incident to the concave, refractive surface R1 of the optical element 1. The light incident into the optical element 1 is repeatedly reflected successively by the concave mirror R2, the convex mirror R3, the concave mirror R4, the convex mirror R5, and the concave mirror R6 along the optical axis 5 and thereafter it emerges at the refractive surface R7 from the optical element 1. The object light 6 is focused primarily to form the object image on the intermediate image plane N1 by the power of the concave mirror R2. This imaging of the object image in the optical element 1 in the early stage restrains the increase in the ray-effective diameters of the surfaces placed on the image side of the stop 4.

The object light 6 undergoing the primary imaging on the intermediate image plane N1 is repeatedly reflected successively by the convex mirror R3, the concave mirror R4, the convex mirror R5, and the concave mirror R6 while being affected by the powers of the respective reflecting mirrors. Then, the material 9 inside the concave mirror R6 absorbs the light of unwanted wavelengths out of the object light 6, and transmits the light 7 of necessary wavelengths which is then reflected by the light reflecting surface of the concave mirror R6 toward the concave, refractive surface R7. The light 7 of necessary wavelengths refracted by the power of the concave, refractive surface R7 forms the object image on the image pickup element surface 3. As described, the optical element 1 functions as an optical unit having the desired optical performance and forming the real image as a whole while repeatedly effecting the refractions by the entrance and exit surfaces and the reflections by the plurality of reflecting mirrors having curvature.

The present embodiment obviates the need for the wavelength selecting filter, which was placed immediately in front of the image pickup element surface 3 heretofore, by forming the material 9 inside the concave mirror R6. Since the material 9 is placed over the reflective surface, the necessary thickness thereof can be half of that in the case of a transmitting surface.

Although in the present embodiment the material 9 was formed inside the concave mirror R6, it is also possible to employ such a configuration that the material 9 is formed inside either one of the concave mirror R2, the convex mirror R3, and concave mirror R4, and the convex mirror R5. In another configuration, the material 9 may be formed inside a plurality of reflective surfaces.

Figure 4:
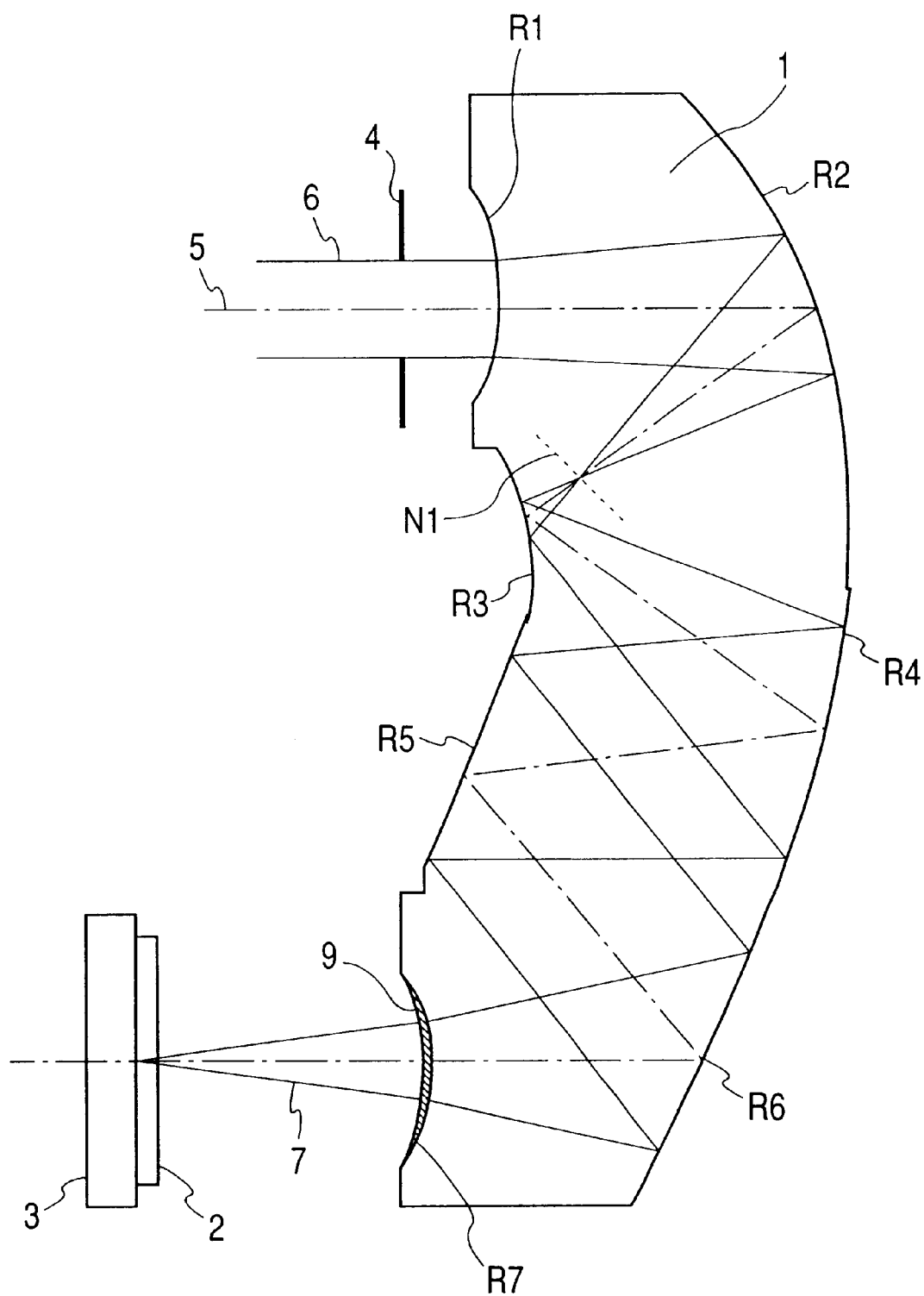
FIG. 4 is a diagram to show the structure of the optical system in Embodiment 4 of the present invention.

FIG. 4 is a schematic diagram of major part of Embodiment 4 of the present invention.

In FIG. 4, the optical element 1 is formed in a solid shape in which two refractive surfaces (R1, R7), which are the entrance and exit surfaces having curvature, and a plurality of reflective surfaces (R2 to R6) are formed in an integral form in surfaces of a transparent body. The optical element 1 is comprised of the two refractive surfaces and the five reflective surfaces, which are a concave, refractive surface R1, a concave mirror R2, a convex mirror R3, a concave mirror R4, a convex mirror R5, a concave mirror R6, and a concave, refractive surface R7 arranged in the named order from the object side. The direction of the reference axis 5 incident to the optical element 1 is approximately parallel and opposite to the direction of the reference axis 5 outgoing from the optical element 1. Numeral 2 designates the optical low-pass filter, 3 the surface of the image pickup element such as the CCD or the like, 4 the stop placed on the object side of the optical element 1, and 5 the reference axis of the photographing optical system. Here the surface of the concave refractive surface R7 is covered by the material 9 that absorbs the light of unwanted wavelengths but transmits the light of necessary wavelengths.

The imaging relation in the present embodiment will be described. The light 6 from the object is regulated in the amount of incident light by the stop 4 and thereafter it is incident to the concave, refractive surface R1 of the optical element 1. The light incident into the optical element 1 is repeatedly reflected successively by the concave mirror R2, the convex mirror R3, the concave mirror R4, the convex mirror R5, and the concave mirror R6 along the optical axis 5 and thereafter it emerges at the refractive surface R7 from the optical element 1. The object light 6 is focused primarily to form the object image on the intermediate image plane N1 by the power of the concave mirror R2. This imaging of the object image in the optical element 1 in the early stage restrains the increase in the ray-effective diameters of the surfaces placed on the image side of the stop 4.

The object light 6 undergoing the primary imaging on the intermediate image plane N1 is repeatedly reflected successively by the convex mirror R3, the concave mirror R4, the convex mirror R5, and the concave mirror R6 while being affected by the powers of the respective reflecting mirrors. Then the light is refracted by the power of the concave, refractive surface R7 and thereafter the material 9 covering the concave, refractive surface R7 absorbs the light of unwanted wavelengths out of the object light 6 but transmits the light 7 of necessary wavelengths to form the object image on the image pickup element surface 3. As described, the optical element 1 functions as a lens unit having the desired optical performance and forming the real image as a whole while repeatedly effecting the refractions by the entrance and exit surfaces and the reflections by the plurality of reflecting mirrors having curvature.

The present embodiment obviates the need for the wavelength selecting filter, which was placed immediately in front of the image pickup element surface 3 heretofore, by covering the surface of the concave, refractive surface R7 by the material 9 that absorbs the light of unwanted wavelengths but transmits the light of necessary wavelengths.

Although in the present embodiment the surface of the concave, refractive surface R7 was covered by the material that absorbs the light of unwanted wavelengths but transmits the light of necessary wavelengths, it is also possible to employ such a configuration that the concave, refractive surface R1 is covered by the material 9. In another configuration, a plurality of refractive surfaces may be covered by the material 9.

It can also be contemplated that an interference film that reflects the light of unwanted wavelengths but transmits the light of necessary wavelengths is used instead of the material 9.

Figure 5:
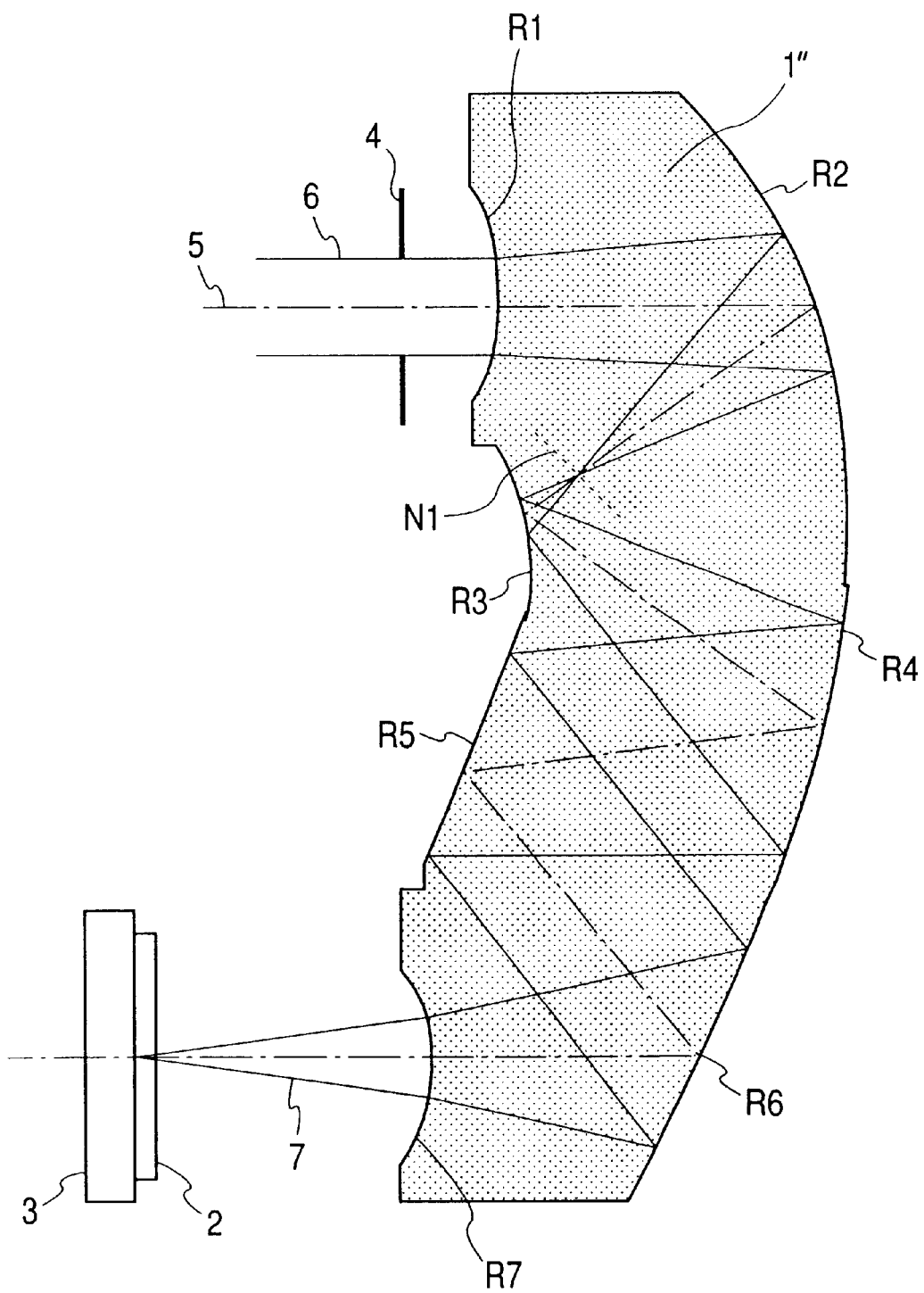
FIG. 5 is a diagram to show the structure of the optical system in Embodiment 5 of the present invention.

FIG. 5 is a schematic diagram of major part of Embodiment 5 of the present invention.

In FIG. 5, the optical element 1" is formed as a solid in which two refractive surfaces (R1, R7), which are the entrance and exit surfaces having curvature, and a plurality of reflective surfaces (R2 to R6) are formed in an integral form in surfaces of a material. The optical element 1" is comprised of the two refractive surfaces and the five reflective surfaces, which are a concave, refractive surface R1, a concave mirror R2, a convex mirror R3, a concave mirror R4, a convex mirror R5, a concave mirror R6, and a concave, refractive surface R7 arranged in the named order from the object side. The direction of the reference axis 5 incident to the optical element 1" is approximately parallel and opposite to the direction of the reference axis 5 outgoing from the optical element 1". Numeral 2 designates the optical low-pass filter, 3 the surface of the image pickup element such as the CCD or the like, 4 the stop disposed on the object side of the optical element 1", and 5 the reference axis of the photographing optical system. Here the optical element 1" is made of the material that absorbs the light of unwanted wavelengths but transmits the light of necessary wavelengths. This material can be selected from the colored glasses, the materials of resin compositions as described in Japanese Patent Application Laid-Open Nos. 6-73197, 6-222211, etc., and so on.

The imaging relation in the present embodiment will be described. The light 6 from the object is regulated in the amount of incident light by the stop 4 and thereafter it is incident to the concave, refractive surface R1 of the optical element 1". The light incident into the optical element 1" is repeatedly reflected successively by the concave mirror R2, the convex mirror R3, the concave mirror R4, the convex mirror R5, and the concave mirror R6 along the reference axis 5 and thereafter it emerges at the refractive surface R7 from the optical element 1". The object light 6 is focused primarily to form the object image on the intermediate image plane N1 by the power of the concave mirror R2. This imaging of the object image in the optical element 1" in the early stage restrains the increase in the ray-effective diameters of the surfaces placed on the image side of the stop 4.

The object light 6 undergoing the primary imaging on the intermediate image plane N1 is repeatedly reflected successively by the convex mirror R3, the concave mirror R4, the convex mirror R5, and the concave mirror R6 while being affected by the powers of the respective reflecting mirrors. Then the light is refracted by the power of the concave, refractive surface R7 to form the object image on the image pickup element surface 3. In this structure, as the object light 6 travels as experiencing the repeated reflections inside the optical element 1", the light of unwanted wavelengths is absorbed while the light 7 of necessary wavelengths is transmitted by the optical element 1".

The present embodiment obviates the need for the wavelength selecting filter, which was placed immediately in front of the image pickup element surface 3 heretofore, by making the optical element 1" of the material that absorbs the light of unwanted wavelengths but transmits the light of necessary wavelengths. Since the optical path through the element is longer than those in the conventional lenses, the material can be one containing only a small amount of an absorbing agent.

It is noted in each of the above embodiments that there is no limitation to the position and number of the intermediate image plane N1; on the contrary the intermediate image plane N1 may be placed anywhere inside the element and a plurality of intermediate image planes can also be applicable. Further, in the above embodiments the direction of the reference axis incident to the optical element is approximately parallel and opposite to the direction of the optical element outgoing from the optical element, but, as described in Japanese Patent Application Laid-Open No. 8-292371, it is also possible to employ a variety of configurations in which the direction of the incident reference axis is different from the direction of the outgoing reference axis. Each of the above embodiments showed the example of the single imaging optical element functioning as a lens unit having the desired optical performance and forming the real image as a whole, but the optical element may also be constructed of a plurality of optical blocks at least one of which is the imaging optical element.

It is also possible to effect zooming by changing relative positions of at least two optical elements out of the plurality of optical blocks.

As described above, in the optical element in which a plurality of refractive surfaces and a plurality of reflective surfaces with curvature are formed in the integral form in the surfaces of the transparent body or in the optical element in which a plurality of surface-reflective surfaces with curvature are formed in the integral form, the reflective surface with curvature or the like is provided with such wavelength selectivity as to remove the light of unwanted wavelengths, whereby the optical element can be accomplished with relaxed restrictions on the design and in the decreased size of the whole optical element and whereby the image pickup optical system incorporating it can also be accomplished.

As described above, in the optical element in which a plurality of reflective surfaces with curvature are formed in the integral form, the reflective surface with curvature or the like is provided with the wavelength selecting function, whereby the imaging optical element can be achieved with relaxed restrictions on the design and in the decreased size of the whole optical element and whereby the image pickup apparatus incorporating it can also be provided. The present invention also obviates the need for the holding member for the wavelength selecting member, thereby presenting the effect of providing the optical element of the decreased production cost and the image pickup apparatus incorporating it.

What is claimed is:

1. An optical element comprising:
   a plurality of reflective surfaces formed integrally, wherein light incident to said optical element is successively reflected by the plurality of reflective surfaces and thereafter emerges from said optical element; and
   means for preventing light other than visible light from emerging from an exit surface and for allowing the visible light to emerge from said exit surface.

2. The optical element according to claim 1, wherein said means for preventing the light other than the visible light from emerging from said exit surface is at least one of said plurality of reflective surfaces, said at least one reflective surface transmitting the light other than the visible light but reflecting the visible light.

3. The optical element according to claim 1, wherein said means for preventing the light of said predetermined wavelength band from emerging from said optical element is at least one of said plurality of reflective surfaces, said at least one reflective surface absorbing the light of said predetermined wavelength band but reflecting light of the other wavelength bands.

4. The optical element according to claim 1, wherein said means for preventing the light other than the visible light from emerging from said exit surface is said plurality of reflective surfaces.

5. The optical element according to claim 1, further comprising:

two refractive surfaces, wherein said two refractive surfaces and said plurality of reflective surfaces are formed integrally in surfaces of an optical material, wherein light incident to said optical element from one of said two refractive surfaces is internally reflected successively by said plurality of reflective surfaces and thereafter is guided to the other refractive surface to emerge from said optical element.

6. The optical element according to claim 5, wherein said means for preventing the light of said predetermined wavelength band from emerging from said optical element is at least one of said two refractive surfaces, said at least one refractive surface absorbing the light of said predetermined wavelength band but transmitting light of the other wavelength bands.

7. The optical element according to claim 5, wherein said means for preventing the light of said predetermined wavelength band from emerging from said optical element is at least one of said two refractive surfaces, said at least one refractive surface reflecting the light of said predetermined wavelength band but transmitting light of the other wavelength bands.

8. The optical element according to claim 5, wherein said means for preventing the light of said predetermined wavelength band from emerging from said optical element is said optical material, said optical material absorbing the light of said predetermined wavelength band but transmitting light of the other wavelength bands.

9. The optical element according to claim 1, wherein said light other than the visible light is infrared light.

10. The optical element according to claim 1, wherein said light other than visible light is ultraviolet light.

11. The optical element according to claim 1, wherein at least one of said plurality of reflective surfaces is a curved surface a normal to which does not agree with a reference axis.

12. The optical element according to claim 11, wherein said curved surface the normal to which does not agree with the reference axis is a rotationally asymmetric, aspherical surface.

13. An optical device comprising:

the optical element as set forth in any one of claims 1 to 12; and an aperture stop.

14. An optical element comprising:

a plurality of reflective surfaces formed integrally, wherein light incident to said optical element is successively reflected by the plurality of reflective surfaces and thereafter emerges from said optical element;

means for preventing light of a predetermined wavelength band from emerging from said optical element; and two refractive surfaces, wherein said two refractive surfaces and said plurality of reflective surfaces are formed integrally in surfaces of an optical material, wherein light incident to said optical element from one of said two refractive surfaces is internally reflected successively by said plurality of reflective surfaces and thereafter is guided to the other refractive surface to emerge from said optical element.

* * * * *

UNITED STATES PATENT AND TRADEMARK OFFICE
CERTIFICATE OF CORRECTION

PATENT NO. : 6,282,018 B1
DATED : August 28, 2001
INVENTOR(S) : Toshihiro Sunaga Page 1 of 1

It is certified that error appears in the above-identified patent and that said Letters Patent is hereby corrected as shown below:

Column 1,
Line 55, "of-faxial" should read -- off-axial --.

Column 2,
Line 54, "of major part of a" should read -- of a major part of --.

Column 3,
Line 1, "among" should read -- from --.

Signed and Sealed this

Ninth Day of April, 2002

Attest:

Attesting Officer

JAMES E. ROGAN
Director of the United States Patent and Trademark Office